United States Patent
Xu et al.

(10) Patent No.: US 12,395,704 B2
(45) Date of Patent: Aug. 19, 2025

(54) METHOD FOR DETERMINING VIDEO PLAYBACK LEVEL, METHOD FOR PLAYING BACK VIDEOS, AND RELATED APPARATUSES

(71) Applicant: BIGO TECHNOLOGY PTE. LTD., Mapletree Business (SG)

(72) Inventors: Yazhu Xu, Guangzhou (CN); Lan Xie, Guangzhou (CN)

(73) Assignee: BIGO TECHNOLOGY PTE. LTD., Mapletree Business (SG)

( * ) Notice: Subject to any disclaimer, the term of this patent is extended or adjusted under 35 U.S.C. 154(b) by 0 days.

(21) Appl. No.: 18/696,476

(22) PCT Filed: Sep. 21, 2022

(86) PCT No.: PCT/CN2022/120221
§ 371 (c)(1),
(2) Date: Mar. 28, 2024

(87) PCT Pub. No.: WO2023/051350
PCT Pub. Date: Apr. 6, 2023

(65) Prior Publication Data
US 2025/0047945 A1 Feb. 6, 2025

(30) Foreign Application Priority Data
Sep. 29, 2021 (CN) .......................... 202111151091.5

(51) Int. Cl.
*H04N 21/472* (2011.01)
*H04N 21/647* (2011.01)

(52) U.S. Cl.
CPC . *H04N 21/47217* (2013.01); *H04N 21/64738* (2013.01)

(58) Field of Classification Search
CPC ....... H04N 21/47217; H04N 21/64738; H04N 21/2402; H04N 21/44209; H04N 21/44227; H04N 21/44004
See application file for complete search history.

(56) References Cited

U.S. PATENT DOCUMENTS

2018/0242191 A1* 8/2018 Lundqvist ............. H04W 72/54
2018/0302660 A1* 10/2018 Olechowski ............ H04L 65/80
(Continued)

FOREIGN PATENT DOCUMENTS

| CN | 101656888 A | 2/2010 |
|---|---|---|
| CN | 105100876 A | 11/2015 |

(Continued)

OTHER PUBLICATIONS

International search report of PCT application No. PCT/CN2022/120221 issued on Nov. 30, 2022.
(Continued)

*Primary Examiner* — Oschta I Montoya
(74) *Attorney, Agent, or Firm* — Dilworth & Barrese, LLP.; Michael J. Musella, Esq.

(57) ABSTRACT

Provided is a method for processing video calls. The method includes: determining a layer bit rate corresponding to each frame layer in video data sent by a transmitter, wherein a plurality of video frames in the video data are organized into a plurality of frame layers based on an inter-frame dependency relationship, and the layer bit rate comprises a bit rate acquired by counting bit rates of video frames in a corresponding frame layer; determining, based on uplink bit rates corresponding to a plurality of receivers and a total downlink detected bandwidth, downlink allocated bandwidths corresponding to the receivers; determining, based on the downlink allocated bandwidths corresponding to the receivers and the layer bit rates, target frame layers corresponding to the receivers; and forwarding video data subjected to
(Continued)

frame extraction processing for the target frame layers to corresponding receivers.

20 Claims, 4 Drawing Sheets

(56) References Cited

U.S. PATENT DOCUMENTS

2021/0051352 A1* 2/2021 Zeng ............... H04N 21/2402
2021/0337271 A1* 10/2021 Ding ............... H04N 21/23439

FOREIGN PATENT DOCUMENTS

| CN | 105263037 A | 1/2016 |
|---|---|---|
| CN | 107105317 A | 8/2017 |
| CN | 108141779 A | 6/2018 |
| CN | 110267100 A | 9/2019 |
| CN | 110430453 A | 11/2019 |
| CN | 111107395 A | 5/2020 |
| CN | 111510771 A | 8/2020 |
| CN | 112019384 A | 12/2020 |
| CN | 112822521 A | 5/2021 |
| CN | 113055698 A | 6/2021 |
| CN | 113891155 A | 1/2022 |
| EP | 0757490 A2 | 2/1997 |
| JP | 2015-97343 A | 5/2015 |
| WO | 2015/062521 A1 | 5/2015 |
| WO | 2016/203185 A1 | 12/2016 |
| WO | 2019/157926 A1 | 8/2019 |
| WO | 2019/245181 A1 | 12/2019 |

OTHER PUBLICATIONS

China National Intellectual Property Administration, First office action of Chinese application No. 202111151091.5 issued on Aug. 28, 2023, which is foreign counterpart application of this US application.
Yanping Zhou et al., Towards simple and smooth rate adaption for VBR video in DASH, 2014 IEEE Visual Communications and Image Processing Conference, Mar. 2, 2015, entire document.
Daxi Tu et al., Dynamic adaptive step-wise bitrate switching algorithm for HTTP streaming, Journal of Computer Applications, vol. 39, No. 4, Apr. 10, 2019, entire document.
Junkai Zeng et al., A dynamic adaptive rate selection algorithm based on buffer threshold adjustment, Guangxi Sciences, vol. 26 No. 3, Aug. 12, 2019, entire document.
China National Intellectual Property Administration, Notification to grant patent right for invention of Chinese application No. 202111151091.5 issued on Mar. 9, 2024, which is foreign counterpart application of this US application.
Yi Sun et al., CS2P: Improving video bitrate selection and adaptation with data-driven throughput prediction, Proceedings of the 2016 ACM SIGCOMM Conference, SIGCOMM '16, Aug. 22-26, 2016, Florianópolis, Brazil, entire document.
Kevin Spiteri et al., BOLA: Near-optimal bitrate adaptation for online videos, IEEE/ACM Transactions on Networking 28.4 (2020): 1698-1711, Jun. 8, 2020, entire document.

* cited by examiner

METHOD FOR DETERMINING VIDEO PLAYBACK LEVEL, METHOD FOR PLAYING BACK VIDEOS, AND RELATED APPARATUSES

This application is a U.S. national stage of international application No. PCT/CN2022/120221, filed on Sep. 21, 2022, which claims priority to Chinese Patent Application No. 202111151091.5, filed on Sep. 29, 2021, the disclosures of which are herein incorporated by references in their entireties.

TECHNICAL FIELD

The present disclosure relates to the field of video playing back technologies, in particular to a method for determining a video playback level, a method for playing back videos, and apparatuses thereof.

BACKGROUND

With the development of the streaming media technologies and the popularization of smart terminal devices, multi-person video application scenarios are more and more popular. With the development of the video and network technologies, several video applications are used in our daily life. Persons post and view videos via the video applications, and video playback means that a server pushes a video stream to the video applications via the server to play back the videos in the video applications. The definition of the video and the fluency of the video playback are ensured in pushing the video streams to ensure the quality in viewing the videos.

SUMMARY

Embodiments of the present disclosure provide a method and apparatus for determining a video playback level, a method and apparatus for playing back videos, an electronic device, and a storage medium.

Some embodiments of the present disclosure provide a method for determining a video playback level. The method incudes:
acquiring data of a video sending state, a size of cached data, and a predicted bandwidth;
determining, based on the data of the video sending state and the size of the cached data, whether a network is in a first-level congested state;
determining a target playback level higher than a current playback level based on the predicted bandwidth, the size of the cached data, and a predetermined first cache threshold in response to determining that the network is not in the first-level congested state;
determining, based on the data of the video sending state and the size of the cached data, whether the network is in a second-level congested state in response to determining that the network is in the first-level congested state, wherein a congestion degree of the second-level congested state is greater than a congestion degree of the first-level congested state;
determining a target playback level from the current playback level and playback levels lower than the current playback level based on the predicted bandwidth, the size of the cached data, and a predetermined second cache threshold in response to determining that the network is in a non-second-level congested state; and
determining a playback level at least one level lower than the current playback level as a target playback level in response to determining that the network is in the second-level congested state.

Some embodiments of the present disclosure provide a method for playing back videos. The method incudes:
receiving a recommended target playback level in playing back video data at a current playback level; and
switching from the current playback level to the recommended target playback level in response to a select operation on the recommended target playback level, and playing back received video data at the recommended target playback level,
wherein the recommended target playback level is determined according to the method for determining the video playback level in the first above embodiments.

Some embodiments of the present disclosure provide an electronic device. The electronic device incudes:
one or more processors;
a memory, configured to store one or more programs,
wherein the one or more processors, when loading and running the one or more programs, are caused to perform the method for determining the video playback level in the above embodiments and/or the method for playing back the videos in the above embodiments.

Some embodiments of the present disclosure provide a non-transitory computer-readable storage medium. The non-transitory computer-readable storage medium stores a computer program, wherein the computer program, when loaded and run by a processor, causes the processor to perform the method for determining the video playback level in the above embodiments and/or the method for playing back the videos in the above embodiments.

DETAILED DESCRIPTION

It should be understood that the embodiments described herein are only intended to explain the present disclosure, rather than to limit the present disclosure. It should be further understood that the accompanying drawings only show some parts but all structures related to the present disclosure. The embodiments in the present disclosure and the features in the embodiments can be combined without conflict.

In the case that an audience views live-streaming videos, a proper definition level is selected in time based on a current bandwidth in a first manner. That is, a higher definition level is selected in the case that the network is good, and the definition is switched to a lower definition level to ensure the fluency of the video playback in the case that the network is not good. A second manner is performed based on a size of user cached data. In the case that the size of the cached data is greater than a predetermined threshold, the definition level is raised, and vice versa, the definition level is lowered. However, in the above first manner, the video playback lag is caused by the frequent switch of the definition level due to the change of the network state and the switch to the over-high level due to the inaccurate bandwidth prediction. In the second manner, the fixed cache threshold is prone to causing the problem of the frequent switch of the definition level and conservative level-switching decision, such that the definition level cannot be switched in time, and the user viewing experience is affected.

In summary, the definition and fluency cannot be balanced in playing back videos in the method for switching the definition level in some practices.

Figure 1:
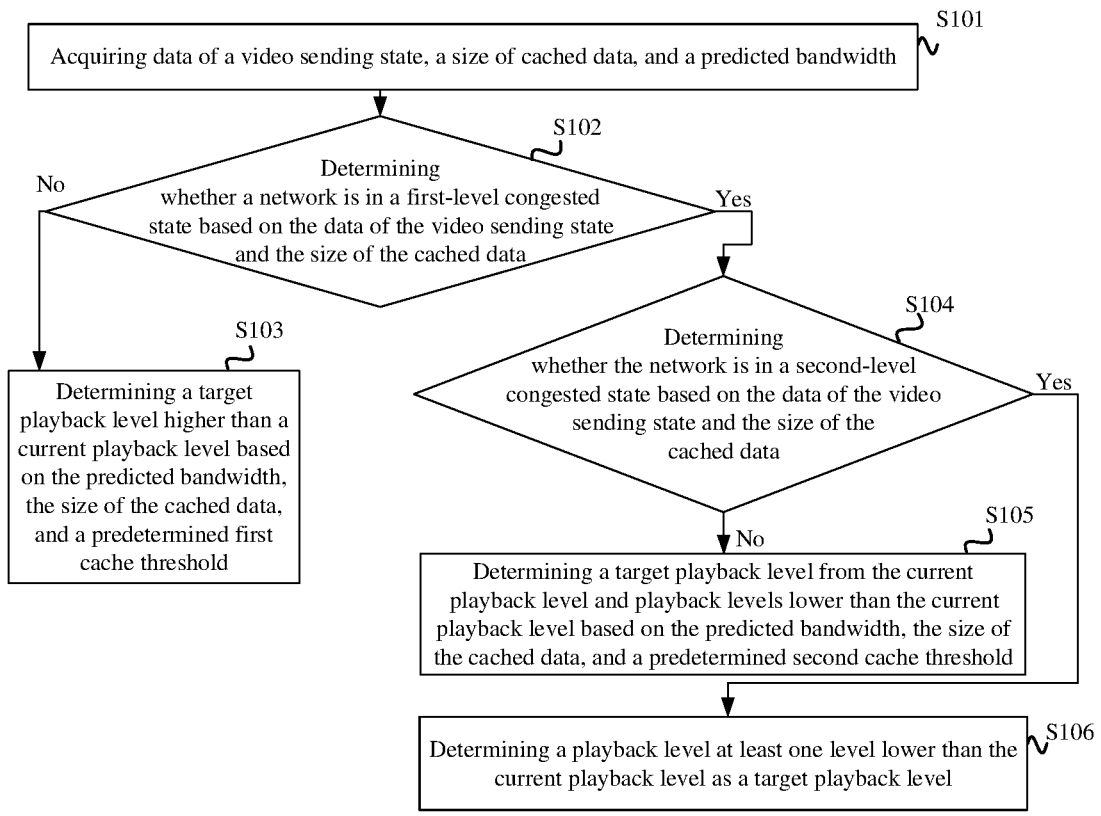
FIG. 1 is a flowchart of a method for determining a video playback level according to some embodiments of the present disclosure.

FIG. 1 is a flowchart of a method for determining a video playback level according to some embodiments of the present disclosure. The embodiments of the present disclosure are capable to the case of determining the video playback level. The method is performed by the apparatus for determining the video playback level according to some embodiments of the present disclosure, and the apparatus for determining the video playback level is achieved by hardware or software and is integrated in the electronic device according to some embodiments of the present disclosure. Illustratively, as shown in FIG. 1, the method for determining the video playback level according to some embodiments of the present disclosure includes the following processes.

In S101, data of a video sending state, a size of cached data, and a predicted bandwidth are acquired.

In the embodiments of the present disclosure, a server receives video data from a video sending end and then pushes the video data to a video data receiving end. In some embodiments, the video data is live streaming video data. The server receives video data from an anchor terminal and pushes the received video data to an audience terminal, such that the video data is played back on the audience terminal. The data of the video sending state is a size of unsent video data received from the anchor terminal, a size of video data sent but not received by the audience terminal, and the like. The size of the cached data is a size of video data stored in a file on the audience terminal. The predicted bandwidth is a network bandwidth that is between the server and the audience terminal and is predicted by several bandwidth predicting methods.

The playback level represents a level of the video playback definition. For example, the playback level includes the low definition, the standard definition, the high-definition, the super definition, and the like. In the embodiments of the present disclosure, number are used to represent the playback levels. The greater the number, the higher the playback level, and the greater the video playback definition.

In the embodiments, the data of the video sending state, the size of the cached data, and the predicted bandwidth are directly or indirectly collected by setting data collecting apparatus on the network.

In S102, whether a network is in a first-level congested state is determined based on the data of the video sending state and the size of the cached data.

In the embodiments of the present disclosure, a first-level congested state and a second-level congested state of the network are set. The congestion degree of the second-level congested state is greater than the congestion degree of the first-level congested state, and the first-level congested state is the first condition used to determine whether to raise the playback level in playing back the videos. For example, the data of the video sending state includes a size of unsent data and a size of unreceived data, and is used to: calculate a first sum of the size of the unsent data and the size of the unreceived data; determine whether the size of the cached data is greater than or equal to a product of the first sum and a predetermined first accumulation coefficient and whether the first sum is less than or equal to a predetermined first accumulation threshold; determine the network is in a non-congested state in response to determining that the size of the cached data is less than the product of the first sum and the predetermined first accumulation coefficient and the first sum is greater than the predetermined first accumulation threshold, and perform S103 to determine whether to raise the playback level; and determine the network is in the first-level congested state in response to determining that the size of the cached data is greater than or equal to the product of the first sum and the predetermined first accumulation coefficient and the first sum is less than or equal to the predetermined first accumulation threshold, and perform S104 to determine whether the network is in the second-level congested state.

In S103, a target playback level higher than a current playback level is determined based on the predicted bandwidth, the size of the cached data, and a predetermined first cache threshold.

In the embodiments of the present disclosure, one or more conditions for raising the playback level are predetermined. For example, a level-raising coefficient between the first cache threshold and the playback level is set in the embodiments of the present disclosure. In the case that the size of the cached data is greater than the first cache threshold and the predicted bandwidth is greater than a product of a playback bitrate of the playback level higher than the current playback level and the level-raising coefficient, the playback level is raised to a higher playback level. In the case that there are several raisable and greater playback levels, a playback level with a highest level is determined as the target playback level, such that the bandwidth is fully used to improve the video playback definition.

It should be noted that in the case that the level-raising condition is met and no proper playback level exists, or the network is in the non-first-level congested state, that is, the network state is greater than the first-level congested state and the level-raising condition is not met, S104 to S106 are performed to determine whether to maintain the playback level with the playback bitrate greater than the predicted bandwidth or lower the playback level.

In S104, whether the network is in a second-level congested state is determined based on the data of the video sending state and the size of the cached data.

With reference to the determination of the first-level congested state, the first sum of the size of the unsent data and the size of the unreceived data is calculated, whether a product of the size of the cached data and a predetermined second accumulation coefficient is less than or equal to the first sum and whether a predetermined second accumulation threshold is less than or equal to the first sum are determined, the network is in a second-level congested state in response to determining that the product of the size of the cached data and the predetermined second accumulation coefficient is less than or equal to the first sum and the predetermined second accumulation threshold is less than or equal to the first sum, and S106 is performed to lower one level from the current playback level, and S105 is performed in response to determining that the product of the size of the cached data and the predetermined second accumulation coefficient is greater than the first sum or the predetermined second accumulation threshold is greater than the first sum, that is, the network is changed in a reasonable range (a network state between the first-level congested state and the second-level congested state), such that whether to maintain the playback level with the playback bitrate greater than the predicted bandwidth or lower the playback level are determined.

In S105, a target playback level is determined from the current playback level and playback levels lower than the current playback level based on the predicted bandwidth, the size of the cached data, and a predetermined second cache threshold in response to determining that the network is in a non-second-level congested state.

For example, in the case that the network is determined to be in the non-second-level congested state, the playback level with the playback bitrate less than the predicted bandwidth is determined as the first candidate playback level, whether the playback level with the playback bitrate greater than the predicted bandwidth and the current playback level are the second candidate playback levels based on the predicted bandwidth, the size of the cached data, and the predetermined second cache threshold, and the playback level with the highest level is determined from the first candidate playback levels and the second candidate playback levels and is determined as the target playback level.

In S106, a playback level at least one level lower than the current playback level is determined as a target playback level in response to determining that the network is in the second-level congested state.

After the network is determined to be in the second-level congested state, all playback levels with the playback bitrates less than the predicted bandwidth are acquired and determined as the candidate playback levels, the playback level with the highest level is selected from all candidate playback levels and is determined as the target playback level for lowering the level, and the playback level with one level lower than the current playback level is determined as the target playback level in the case that the playback level with the highest level is selected from all candidate playback levels and is determined as the target playback level.

In the embodiments of the present disclosure, the data of the video sending state, a size of cached data, and a predicted bandwidth are acquired, and whether a network is in a first-level congested state is determined based on the data of the video sending state and the size of the cached data. The target playback level higher than a current playback level is determined based on the predicted bandwidth, the size of the cached data, and a predetermined first cache threshold in response to determining that the network is not in the first-level congested state, and whether the network is in a second-level congested state is determined based on the data of the video sending state and the size of the cached data in response to determining that the network is in the first-level congested state. The target playback level is determined from the current playback level and the playback levels lower than the current playback level based on the predicted bandwidth, the size of the cached data, and the predetermined second cache threshold in response to determining that the network is in a non-second-level congested state, and the playback level at least one level lower than the current playback level is determined as the target playback level in response to determining that the network is in the second-level congested state. In the embodiments of the present disclosure, whether to raise the level or lower the lever is determined by combining the predicted bandwidth and the size of the cached data, different cache thresholds are set for raising the level and lowering the level, and different network congested states are set for raising the level and lowering the level, such that whether to raise the level or lower the lever is determined by combining the network congested state, the size of the cached data, and the predicted bandwidth. Thus, the case of the video lag caused by switching the playback level with inaccurate bandwidth prediction is avoided, the case of the frequent switch of the playback level caused by the single cache threshold and the changed network in switching the level is also avoided, and thus the definition and the fluency are balanced in playing back videos.

Figure 2:
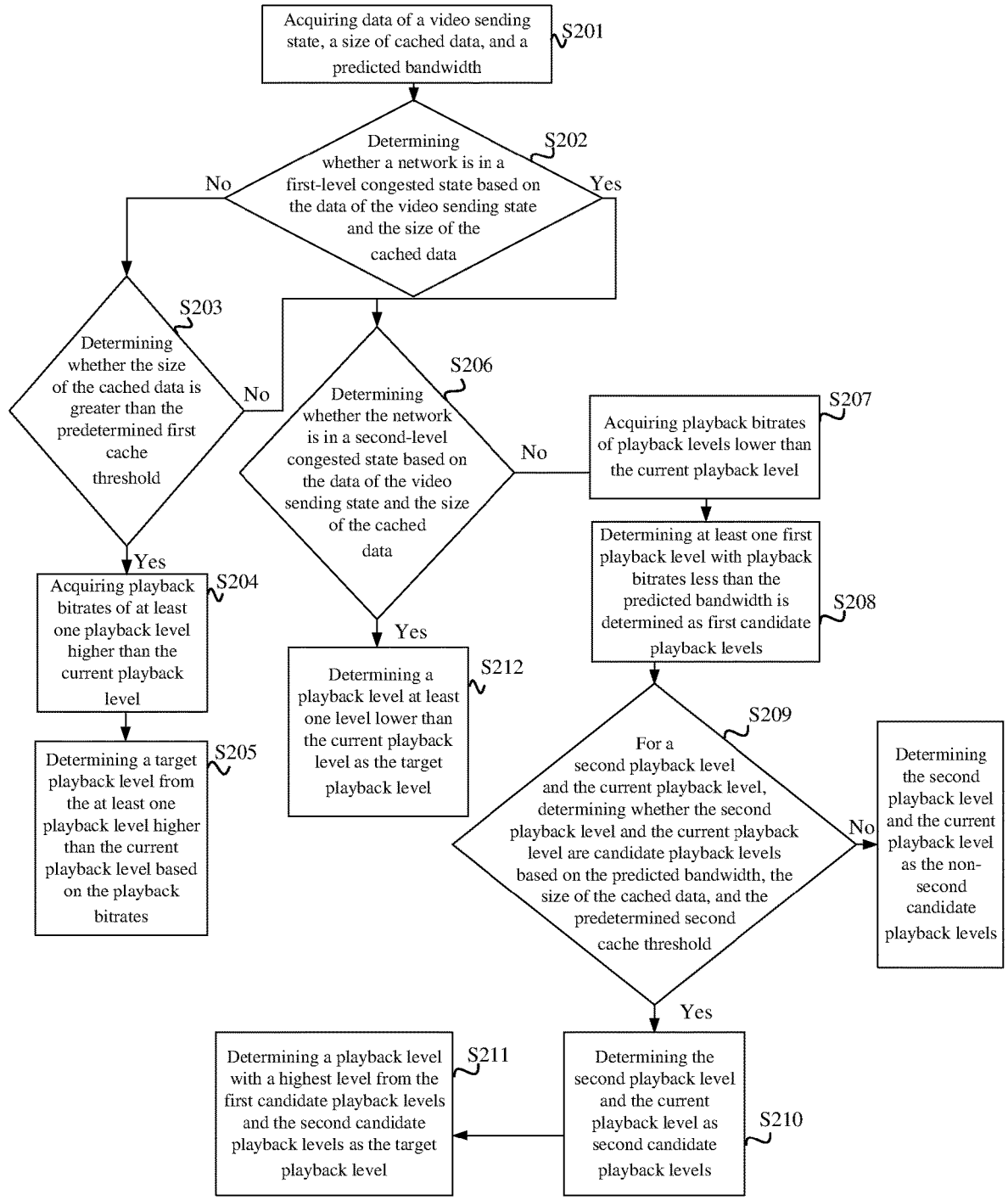
FIG. 2 is a flowchart of a method for determining a video playback level according to some embodiments of the present disclosure.

FIG. 2 is a flowchart of a method for determining a video playback level according to some embodiments of the present disclosure, and the embodiments of the present are further detailed on the basis of the above embodiments. For example, as shown in FIG. 2, the method for determining the video playback level according to some embodiments of the present disclosure includes the following processes.

In S201, data of a video sending state, a size of cached data, and a predicted bandwidth are acquired.

In the embodiments of the present disclosure, the data of the video sending state incudes the size of the unsent data durFrameList and the size of the unreceived data inflightLen, the size of the cached data jitterLen is the size of the video data cached in the video playback client, and the predicted bandwidth bw is the network bandwidth predicted between the server and the video playback client.

In the embodiments, the data of the video sending state, the size of the cached data, and the predicted bandwidth are directly or indirectly collected by setting a data collecting apparatus on the network.

In S202, whether a network is in a first-level congested state is determined based on the data of the video sending state and the size of the cached data.

In the embodiments of the present disclosure, a first sum of the size of the unsent data and the size of the unreceived data is calculated, and whether the size of the cached data is greater than or equal to a product of the first sum and a predetermined first accumulation coefficient and whether the first sum is less than or equal to a predetermined first accumulation threshold are determined. The network is in a non-congested state in response to determining that the size of the cached data is less than the product of the first sum and the predetermined first accumulation coefficient or the first sum is greater than the predetermined first accumulation threshold, and the network is in the first-level congested state in response to determining that the size of the cached data is greater than or equal to the product of the first sum and the predetermined first accumulation coefficient and the first sum is less than or equal to the predetermined first accumulation threshold. That is, the network is in the non-congested state in the case that the following two conditions are simultaneously met, and the network is in the first-level congested state in the case that the following two conditions are not simultaneously met:

$$\text{jitterLen} \geq k_1 \times (durFrameList + \text{inflightLen})$$

$$J_1 \geq durFrameList + \text{inflightLen}$$

k1 represents the first accumulation coefficient, and J1 represents the first accumulation threshold.

In the embodiments of the present disclosure, whether the network is congested is determined based on the size of the cached data, the accumulation threshold, the size of the unsent data, and the size of the unreceived data, such that the determination of the network congestion based on the size of the data sent and received over the network is achieved. Compared with the determination of the network congestion based on the time delay, the accuracy of the determination of the congested network state is greater, and thus is more suitable to the scenario of the data stream transmission in playing back the video data.

In the case that the above conditions are simultaneously met, the network is in the non-congested state. That is, the network state is greater than the first-level congested state, and thus S203 to S205 are performed. In the case that the network is in the first-level congested state, S206 to S212 are performed.

In S203, whether the size of the cached data is greater than the predetermined first cache threshold is determined.

In the embodiments of the present disclosure, the first cache threshold J0 is a minimum cache threshold required in raising the playback level. That is, in the case that the size of the cached data is less than the first cache threshold J0, the playback level is not raised. Thus, whether the size of the cached data is greater than the predetermined first cache threshold J0 is determined. In the case of determining that the size of the cached data is greater than the first cache threshold, the network is in the non-congested state, and the bandwidth is raised, such that S204 to S205 are performed to raise the playback level. In the case of determining that the size of the cached data is less than or equal to the first cache threshold, the network is in the non-congested state, and the bandwidth is not raised, such that the playback level with the playback bitrate greater than the predicted bandwidth is maintained or the level is lowered, and S206 to S212 are performed.

In S204, playback bitrates of at least one playback level higher than the current playback level are acquired.

In some embodiments, the current playback level is the standard definition, and at least one playback level higher than the current playback level includes the high-definition, the super definition, and the playback levels with greater definitions. The higher the playback level, the greater the playback bitrate. In the embodiments of the present disclosure, the server receives playback bitrates at several playback levels in receiving the data from the video data sending end. The playback bitrate is related to the video acquiring device and the codes on the video data sending end. For the video data, playback bitrates corresponding to several playback levels are set on the video data sending end.

In S205, the target playback level is determined from the at least one playback level higher than the current playback level based on the playback bitrates.

In the embodiments of the present disclosure, for any two adjacent first playback level and second playback level that are higher than the current playback level, a level-raising coefficient of the first playback level is acquired by calculating a ratio of a playback bitrate of the second playback level to a playback bitrate of the first playback level, and the second playback level is higher than the first playback level. A product of the playback bitrate of the first playback level and the level-raising coefficient is calculated, and whether the predicted bandwidth is greater than the product is determined. The first playback level is determined as a candidate playback level in response to determining that the predicted bandwidth is greater than the product and a highest level is selected from candidate playback levels and determined as the target playback level.

For example, assuming that x and x+1 respectively represent any two adjacent first playback level and second playback level that are higher than the current playback level, br(x) represents the playback bitrate of the first playback level, br(x+1) represents the playback bitrate of the second playback level. In some embodiments, the level-raising coefficient $\alpha(x)$ for raising the first playback level x to the second playback level x+1 is calculated by:

$$\alpha(x) = br(x+1)/br(x)$$

For example, after the ratio of br(x+1)/br(x) is acquired, a smaller value is determined from the ratio and the predetermined maximum level-raising coefficient $\alpha_{max}$, and a larger value is determined from the smaller value and the predetermined minimum level-raising coefficient $\alpha_{min}$. That is, $\alpha(x)$ is also calculated as follows:

$$\alpha(x) = \max(\min(br(x+1)/br(x), \alpha_{max}), \alpha_{min})$$

In the case that the playback level is the highest playback level, the level-raising coefficient of the highest playback level is $\alpha_{min}$.

The current playback level is raised to the playback level x in the case that the following condition is met:

$$bw \geq br(x) \times \alpha(x)$$

It should be noted that in the case that several playback levels to be raised exist, a playback level with the highest level is selected from the several playback levels to be raised and is determined as the target playback level. In some embodiments, the current playback level is the low definition, and the super definition is determined as the target playback level in the case that the standard definition, the high definition, and the super definition are all met the level-raising condition.

The level-raising coefficient $\alpha(x)$ between the playback levels set in the embodiments of the present disclosure can ensure to raise to playback level x in the case that the predicted bandwidth bw meets the playback level x+1, such that the case that the level is difficult to raise due to the great difference between the playback levels or the level is raised and lowered repeatedly due to the less difference between the playback levels is avoided. Thus, the level is raised to higher and proper level in time in the case that the network is great, and the level is avoided to be raised and lowered repeatedly due to changed network. In addition, the level-raising coefficient is assigned based on the ratio of the playback bitrates between the playback levels, such that different transcoding lists in the live-streaming rooms are greatly adapted.

It should be noted that in the case that the predicted bandwidth is less than all products of the playback bitrates and the level-raising coefficient, no proper playback level is used to raise, the predicted bandwidth does not support the level-raising, and S206 to S212 are performed to determine whether to maintain at the playback level with the playback bitrate greater than the predicted bandwidth or to lower the playback level.

In S206, whether the network is in a second-level congested state is determined based on the data of the video sending state and the size of the cached data.

In the embodiments of the present disclosure, a first sum of the size of the unsent data and the size of the unreceived data is calculated, and whether a product of the size of the cached data and a predetermined second accumulation coefficient is less than or equal to the first sum and whether a predetermined second accumulation threshold is less than or equal to the first sum are determined. The network is determined to be in the second-level congested state in response to determining that the product of the size of the cached data and the predetermined second accumulation coefficient is less than or equal to the first sum and the predetermined second accumulation threshold is less than or equal to the first sum, and thus S212 is performed. The network is determined to be in the non-second-level congested state in response to determining that the product of the size of the cached data and the predetermined second accumulation coefficient is greater than the first sum or the predetermined second accumulation threshold is greater than the first sum, and thus S207 to S211 are performed to determine whether to maintain at the playback level with the playback bitrate greater than the predicted bandwidth or to lower the playback level. For example, the network is determined to be in the second-level congested state in meeting the following conditions, and the network is determined to be in the non-second-level congested state in not meeting the following conditions:

$$k_2 \times \text{jitterLen} \leq (\text{durFrameList} + \text{inflightLen})$$

$$J_2 \leq \text{durFrameList} + \text{inflightLen}$$

k2 represents the second accumulation coefficient, and J2 represents the second accumulation threshold.

In the embodiments of the present disclosure, whether the network is congested is determined based on the size of the cached data, the accumulation threshold, the size of the unsent data, and the size of the unreceived data, such that the determination of the network congestion based on the size of the data sent and received over the network is achieved. Compared with the determination of the network congestion based on the time delay, the accuracy of the determination of the congested network state is greater, and thus is more suitable to the scenario of the data stream transmission in playing back the video data.

In S207, playback bitrates of playback levels lower than the current playback level are acquired.

Illustratively, after the network is determined to be in the first-level congested state and does not meet the level-raising condition, in the case that the network is in the non-second-level congested state, that is, the network state is between the first-level congested state or the second-level congested state and does not meet the level-raising condition, the playback level is maintained at the playback level with the playback bitrate greater than the predicted bandwidth or is lowered, and the playback bitrates of all playback levels lower than the current playback level are acquired.

In S208, at least one first playback level with playback bitrates less than the predicted bandwidth is determined as first candidate playback levels.

In the case that the playback bitrate of the first playback level lower than the current playback level is lower than the predicted bandwidth, the first playback level is determined as the first candidate playback level for lowering the level.

It should be noted that the playback level with the lowest playback level is determined as the first candidate playback level in the case that all playback bitrates are greater than the predicted bandwidth.

In S209, for a second playback level and the current playback level, whether the second playback level and the current playback level are candidate playback levels is determined based on the predicted bandwidth, the size of the cached data, and the predetermined second cache threshold, wherein the second playback level is a playback level with a playback bitrate greater than the predicted bandwidth and less than a playback bitrate of the current playback level.

S210 to S211 are performed in response to determining that the second playback level and the current playback level are candidate playback levels, and the second playback level and the current playback level are determined as the non-second candidate playback levels in response to determining that the second playback level and the current playback level are not the candidate playback levels.

In the embodiments of the present disclosure, the playback level with the playback bitrate greater than the predicted bandwidth and less than the playback bitrate of the current playback level is determined as the second playback level, and whether the second playback level and the current playback level are the candidate playback levels is determined.

In the embodiments of the present disclosure, the second playback level and the current playback level are determined as the candidate playback levels. For each candidate playback level, a screen set length and a screen set non-sending ratio corresponding to the current playback level are acquired, a dynamic cache threshold is calculated based on a level-lowering coefficient, the screen set length, the ratio, and a predetermined desired duration, and a greater cache threshold is determined from the dynamic cache threshold and the second cache threshold. Whether the predicted bandwidth is greater than or equal to a product of a playback bitrate of the candidate playback level and the level-lowering coefficient and whether the size of the cached data is greater than a sum of the greater cache threshold and the size of the unreceived data are determined. The candidate playback level is determined as the candidate playback level in response to determining that the predicted bandwidth is greater than or equal to the product of the playback bitrate of the each candidate playback level and the level-lowering coefficient and the size of the cached data is greater than the sum of the greater cache threshold and the size of the unreceived data, and the candidate playback level is determined as a non-candidate playback level in response to determining that the predicted bandwidth is less than or equal to the product of the playback bitrate of the each candidate playback level and the level-lowering coefficient or the size of the cached data is less than or equal to the sum of the greater cache threshold and the size of the unreceived data.

Illustratively, the dynamic cache threshold is equal to the sum of the first accumulation threshold j1 and the second accumulation threshold j2. In some embodiments, the first accumulation threshold j1 is the size of the cache data required for waiting bandwidth recovery, and the first accumulation threshold j1 is calculated as follows:

The playback level is lowered to the candidate playback level x with the playback bitrate greater than the predicted bandwidth bw based on the level-lowering coefficient, and the playback bitrate br(x) the candidate playback level meets:

$$bw \geq br(x) \times \beta > bw \times \beta$$

β represents the level-lowering coefficient, and $\beta \in (0,1)$.

In the case that the consumed duration in switching the playback level is not considered, the size of the cached data is slowly reduced as the predicted bandwidth bw is less than the current playback bitrate br(x) at the following rate per second:

$$\Delta = br(x)/bw - 1$$

and thus:

$$0 < \Delta \leq 1/\beta - 1.$$

In the case that the network bandwidth change is recovered in a predetermined desirable duration t, and then:

$$j_1 > t \times \Delta.$$

Thus, the video is not jagged in playing back in the case that $j_1 > t \times (1-\beta)/\beta$.

In some embodiments, the second accumulation threshold j2 is the size of the cache data required for sending the video data at the current playback level before switching the playback level. The second accumulation threshold j2 is calculated as follows:

Assuming that playback level is switched to a new playback level on the network screen set, and the current screen set length of the current playback level is gopLen, a proportion of the non-sending screen meets $0 < \gamma < 1$, and thus the cache data required for sending the screen set is:

$$j_2 = (br(x)/bw - 1) \times gopLen \times \gamma.$$

Thus, the dynamic cache threshold $J = j_1 + j_2$.

The candidate playback level is determined in the case that the following two conditions are met:

$$bw \geq br(x) \times \beta$$

jitterLen >

$$\max(t \times (1-\beta)/\beta + (br(x0)/bw - 1) \times (gopLen \times \gamma + inflightLen), 500) + inflightLen$$

As described in the following formulas, the second cache threshold can be set as 500.

In the embodiments of the present disclosure, the dynamic cache threshold is calculated based on the level-lowering coefficient, the screen set length, the ratio, and the predetermined desired duration, such that the cache threshold and the network state are adapted. The cache threshold is dynamically adjusted to determine whether the playback level with the playback bitrate greater than the predicted bandwidth is determined as the candidate playback level. Compared with the case that only the playback level with the playback bitrate less than the predicted bandwidth is determined as the candidate playback level, the embodiments can maximize the use of the network bandwidth. Thus, the definition of the video playback is ensured, and the frequent switch of the playback level due to the level lowering in the case that the size of the cached data is less than a fixed cache threshold is avoided. In addition, the dynamic cache threshold can be used to determine the congested risk greatly, such that the lag caused by the untimely level lowering is avoided, and the fluency of the video playback is ensured.

In S210, the second playback level and the current playback level are determined as second candidate playback levels.

In the case that the second playback level and the current playback level are determined as the candidate playback levels based on the predicted bandwidth, the size of the cached data, and the predetermined second cache threshold, the second playback level and the current playback level are determined as the second candidate playback levels.

In S211, a playback level with a highest level is determined from the first candidate playback levels and the second candidate playback levels as the target playback level.

In the embodiments of the present disclosure, the first candidate playback levels and the second candidate playback levels respectively include several playback levels, and thus a playback level with a highest level is determined from all playback levels in the first candidate playback levels and the second candidate playback levels as the target playback level.

In S212, a playback level at least one level lower than the current playback level is determined as the target playback level.

Illustratively, all playback levels with the playback bitrates less than the predicted bandwidth are acquired and determined as the candidate playback levels, the playback level with the highest level is selected from all candidate playback levels and is determined as the target playback level for lowering the level, and the playback level with one level lower than the current playback level is determined as the target playback level in the case that the playback level with the highest level is selected from all candidate playback levels and is determined as the target playback level.

In the embodiments of the present disclosure, whether to raise the level or lower the lever is determined by combining the predicted bandwidth and the size of the cached data, different cache thresholds are set for raising the level and lowering the level, and different network congested states are set for raising the level and lowering the level, such that whether to raise the level or lower the lever is determined by combining the network congested state, the size of the cached data, and the predicted bandwidth. Thus, the case of the video lag caused by switching the playback level with inaccurate bandwidth prediction is avoided, the case of the frequent switch of the playback level caused by the single cache threshold and the changed network in switching the level is also avoided, and thus the definition and the fluency are balanced in playing back videos.

Figure 3:
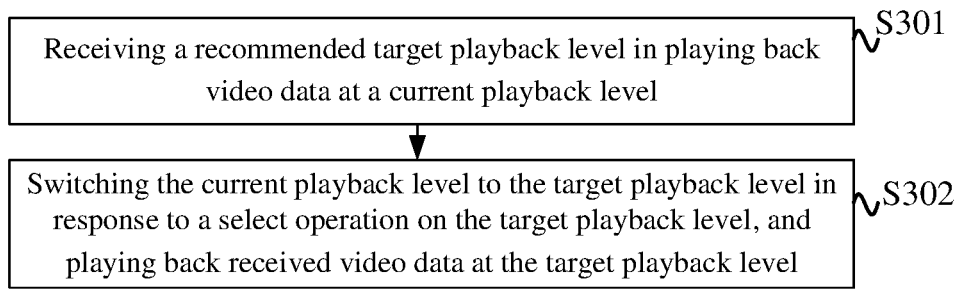
FIG. 3 is a flowchart of a method for playing back videos according to some embodiments of the present disclosure.

FIG. 3 is a flowchart of a method for playing back videos according to some embodiments of the present disclosure. The embodiments of the present disclosure are applicable to the case of video playback. The method is performed by the apparatus for playing back the videos according to some embodiments of the present disclosure, the apparatus for playing back the videos is achieved by hardware or software and is integrated in the electronic device according to some embodiments of the present disclosure. Illustratively, as shown in FIG. 3, the method for playing back the videos according to some embodiments of the present disclosure includes the following processes.

In S301, a recommended target playback level is received in playing back video data at a current playback level.

The server receives video data from the video sending end and then pushes the video data to the video data receiving end to play back the video data on the video receiving end. The video receiving end plays back the video data at an appointed playback level. The playback level includes the low definition, the standard definition, the high-definition, the super definition, and the like.

In pushing the video data, the server determines the target playback level based on the data of the video sending state and the predicted bandwidth between the server and the video data receiving end and the size of the cached data on the video data receiving end, and recommends the target playback level to the video data receiving end.

Illustratively, the server determines the target playback level by the method for determining the video playback level in the above embodiments, and the detailed descriptions are referred to the above embodiments, which are not repeated.

In S302, the current playback level is switched to the target playback level in response to a select operation on the target playback level, and received video data is played back at the target playback level.

The video data receiving end plays back the video data upon receiving the video data. In the case that the target playback level recommended by the server is received, prompt information and an option for selecting the target playback level to playing back the video data are generated. In the case that the select operation on the option is detected, the current playback level is switched to the target playback level in response to the select operation, and the received video data is played back at the target playback level. Illustratively, the standard definition is switched to the high definition, or the super definition is switched to the standard definition, and the like.

In the method for playing back the videos in the embodiments of the present disclosure, the target playback level is determined by the method for determining the video playback level in the above embodiments. That is, the dynamic cache threshold is calculated based on the level-lowering coefficient, the screen set length, the ratio, and the predetermined desired duration, such that the cache threshold and the network state are adapted. The determination of whether to lower the level based on the cache threshold can maximize the use of the network bandwidth. In addition, whether to maintain the level in the network congestion can be accurately determined based on the cache threshold, such that the network congestion is avoided, the frequent raising or lowering of the playback level due to the level lowering in the case that the size of the cached data is less than a fixed cache threshold is avoided, and the definition and the fluency of the video playback are ensured.

Figure 4:
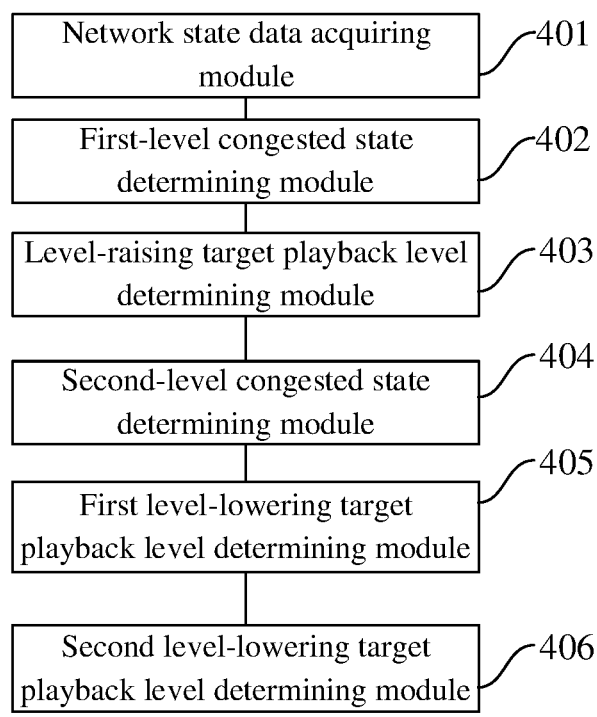
FIG. 4 is a structural diagram of an apparatus for determining a video playback level according to some embodiments of the present disclosure.

FIG. 4 is a structural diagram of an apparatus for determining a video playback level according to some embodiments of the present disclosure. As shown in FIG. 4, the apparatus for determining the video playback level according to some embodiments of the present disclosure includes:

a network state data acquiring module 401, configured to acquire data of a video sending state, a size of cached data, and a predicted bandwidth;

a first-level congested state determining module 402, configured to determine, based on the data of the video sending state and the size of the cached data, whether a network is in a first-level congested state;

a level-raising target playback level determining module 403, configured to determine a target playback level higher than a current playback level based on the predicted bandwidth, the size of the cached data, and a predetermined first cache threshold;

a second-level congested state determining module 404, configured to determine whether the network is in a second-level congested state based on the data of the video sending state and the size of the cached data, wherein a congestion degree of the second-level congested state is greater than a congestion degree of the first-level congested state;

a first level-lowering target playback level determining module 405, configured to determine a target playback level from the current playback level and playback levels lower than the current playback level based on the predicted bandwidth, the size of the cached data, and a predetermined second cache threshold in response to determining that the network is in a non-second-level congested state; and a second level-lowering target playback level determining module 406, configured to determine a playback level at least one level lower than the current playback level as a target playback level.

The apparatus for determining the video playback level according to some embodiments of the present disclosure is capable to performing the method for determining the video playback level according to above embodiments of the present disclosure and has corresponding functional modules and technical effects compared with performing the method.

Figure 5:
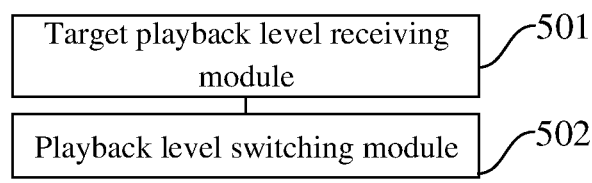
FIG. 5 is a structural diagram of an apparatus for playing back videos according to some embodiments of the present disclosure.

FIG. 5 is a structural diagram of an apparatus for playing back videos according to some embodiments of the present disclosure. As shown in FIG. 5 the apparatus for playing back the videos according to some embodiments of the present disclosure includes:

a target playback level receiving module 501, configured to receive a recommended target playback level in playing back video data at a current playback level; and a playback level switching module 502, configured to switch from the current playback level to the target playback level in response to a select operation on the target playback level, and play back received video data at the target playback level, the target playback level is determined according to the method for determining the video playback level in the above embodiments.

The apparatus for playing back the videos according to some embodiments of the present disclosure is capable to performing the method for playing back the videos according to above embodiments of the present disclosure and has corresponding functional modules and technical effects compared with performing the method.

Figure 6:
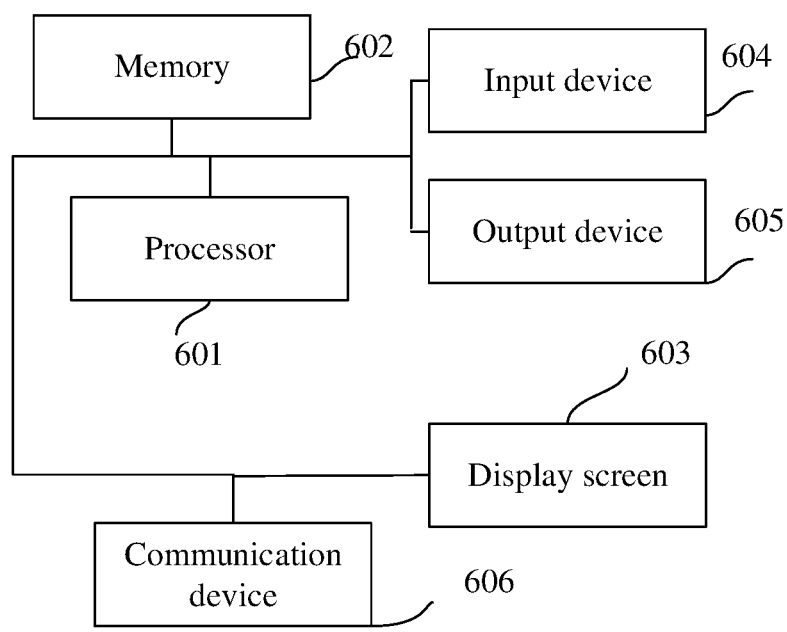
FIG. 6 is a schematic structural diagram of an electronic device according to some embodiments of the present disclosure.

Referring to FIG. 6, a schematic structural diagram of an electronic device according to some embodiments of the present disclosure is shown. As shown in FIG. 6, the electronic device includes: a processor 601, a memory 602, a display screen 603 with a touch function, an input device 604, an output device 605, and a communication device 606. One or more processor 601 are set in the electronic device, and FIG. 6 is shown by taking one processor 601 as an example. The processor 601, the memory 602, the display screen 603, the input device 604, the output device 605, and the communication device 606 are connected by a bus or other manner, and FIG. 6 is shown by taking the bus as an example. The electronic device performs the method for determining the video playback level and/or the method for playing back videos in any embodiment of the present disclosure.

A non-transitory computer-readable storage medium is further provided in the embodiments of the present disclosure. The instructions in the storage medium, when loaded and run by a processor of a device, cause the device to perform the method for determining the video playback level and/or the method for playing back the videos in the above embodiments.

It should be noted that the embodiments of the apparatus, the electronic device, and the storage medium are the similar to the embodiments of the methods, and thus the descriptions are simple, and the related descriptions are referred to the embodiments of the methods.

In the descriptions of the present specification, the descriptions about reference terms such as "an embodiment," "some embodiment," "examples," "some specific examples," "some specific examples," and the like mean that the specific features, structures, materials or characteristics described in combination with the embodiments or examples are included in at least one embodiment or example of the present disclosure. In the present specification, the schematic descriptions of the above terms do not necessarily refer to a same embodiment or example. Furthermore, the specific features, structures, materials or characteristics as described can be combined with any one or more embodiments or examples in a proper manner.

The invention claimed is:

1. A method for determining a video playback level, comprising:
    acquiring data of a video sending state, a size of cached data, and a predicted bandwidth;
    determining, based on the data of the video sending state and the size of the cached data, whether a network is in a first-level congested state;
    determining a target playback level higher than a current playback level based on the predicted bandwidth, the size of the cached data, and a predetermined first cache threshold in response to determining that the network is not in the first-level congested state;
    determining, based on the data of the video sending state and the size of the cached data, whether the network is in a second-level congested state in response to determining that the network is in the first-level congested state, wherein a congestion degree of the second-level congested state is greater than a congestion degree of the first-level congested state;
    determining a target playback level from the current playback level and playback levels lower than the current playback level based on the predicted bandwidth, the size of the cached data, and a predetermined second cache threshold in response to determining that the network is in a non-second-level congested state; and
    determining a playback level at least one level lower than the current playback level as a target playback level in response to determining that the network is in the second-level congested state.

2. The method according to claim 1, wherein
    the data of the video sending state comprises a size of unsent data and a size of unreceived data, and
    determining, based on the data of the video sending state and the size of the cached data, whether the network is in the first-level congested state comprises:
        calculating a first sum of the size of the unsent data and the size of the unreceived data;
        determining whether the size of the cached data is greater than or equal to a product of the first sum and a predetermined first accumulation coefficient and whether the first sum is less than or equal to a predetermined first accumulation threshold;
        determining that the network is in the first-level congested state in response to determining that the size of the cached data is greater than or equal to the product of the first sum and the predetermined first accumulation coefficient and the first sum is less than or equal to the predetermined first accumulation threshold; and
        determining that the network is in a non-congested state in response to determining that the size of the cached data is less than the product of the first sum and the predetermined first accumulation coefficient or the first sum is greater than the predetermined first accumulation threshold.

3. The method according to claim 1, wherein determining the target playback level higher than the current playback level based on the predicted bandwidth, the size of the cached data, and the predetermined first cache threshold comprises:
    determining whether the size of the cached data is greater than the predetermined first cache threshold;
    acquiring playback bitrates of at least one playback level higher than the current playback level in response to determining that the size of the cached data is greater than the predetermined first cache threshold;
    determining the target playback level from the at least one playback level higher than the current playback level based on the playback bitrates; and
    performing the process of determining, based on the data of the video sending state and the size of the cached data, whether the network is in the second-level congested state in response to determining that the size of the cached data is less than or equal to the predetermined first cache threshold.

4. The method according to claim 3, wherein determining the target playback level from the at least one playback level higher than the current playback level based on the playback bitrates comprises:
    for any two adjacent first playback level and second playback level that are higher than the current playback level, acquiring a level-raising coefficient of the first playback level by calculating a ratio of a playback bitrate of the second playback level to a playback bitrate of the first playback level, wherein the second playback level is higher than the first playback level;
    calculating a product of the playback bitrate of the first playback level and the level-raising coefficient;
    determining whether the predicted bandwidth is greater than the product;
    determining the first playback level as a candidate playback level in response to determining that the predicted bandwidth is greater than the product; and
    selecting a highest level from candidate playback levels and determining as the target playback level.

5. The method according to claim 4, wherein for any two adjacent first playback level and second playback level that are higher than the current playback level, acquiring the level-raising coefficient of the first playback level by calculating the ratio of the playback bitrate of the second playback level to the playback bitrate of the first playback level comprises:
calculating, for any two adjacent first playback level and second playback level that are higher than the current playback level, the ratio of the playback bitrate of the second playback level to the playback bitrate of the first playback level;
determining a smaller value from the ratio and a predetermined maximum level-raising coefficient; and
determining a larger value from the smaller value and a predetermined minimum level-raising coefficient as the level-raising coefficient.

6. The method according to claim 4, further comprising:
performing the process of determining, based on the data of the video sending state and the size of the cached data, whether the network is in the second-level congested state in response determining that the predicted bandwidth is less than the product.

7. The method according to claim 1, wherein
the data of the video sending state comprises a size of unsent data and a size of unreceived data, and
determining, based on the data of the video sending state and the size of the cached data, whether the network is in the second-level congested state comprises:
calculating a first sum of the size of the unsent data and the size of the unreceived data;
determining whether a product of the size of the cached data and a predetermined second accumulation coefficient is less than or equal to the first sum and whether a predetermined second accumulation threshold is less than or equal to the first sum;
determining the network is in the second-level congested state in response to determining that the product of the size of the cached data and the predetermined second accumulation coefficient is less than or equal to the first sum and the predetermined second accumulation threshold is less than or equal to the first sum; and
determining the network is in the non-second-level congested state in response to determining that the product of the size of the cached data and the predetermined second accumulation coefficient is greater than the first sum or the predetermined second accumulation threshold is greater than the first sum.

8. The method according to claim 1, wherein determining the target playback level from the current playback level and the playback levels lower than the current playback level based on the predicted bandwidth, the size of the cached data, and the predetermined second cache threshold in response to determining that the network is in the non-second-level congested state comprises:
acquiring playback bitrates of playback levels lower than the current playback level;
determining at least one first playback level with playback bitrates less than the predicted bandwidth as first candidate playback levels;
for a second playback level and the current playback level, determining, based on the predicted bandwidth, the size of the cached data, and the predetermined second cache threshold, whether the second playback level and the current playback level are candidate playback levels, wherein the second playback level is a playback level with a playback bitrate greater than the predicted bandwidth and less than a playback bitrate of the current playback level;
determining the second playback level and the current playback level as second candidate playback levels in response to determining that the second playback level and the current playback level are candidate playback levels; and
determining a playback level with a highest level from the first candidate playback levels and the second candidate playback levels as the target playback level.

9. The method according to claim 8, wherein for the second playback level and the current playback level, determining, based on the predicted bandwidth, the size of the cached data, and the predetermined second cache threshold, whether the second playback level and the current playback level are the candidate playback levels comprises:
for each candidate playback level in the second playback level and the current playback level, acquiring a current playback bitrate of the current playback level;
acquiring a screen set length and a screen set non-sending ratio corresponding to the current playback level;
calculating a dynamic cache threshold based on a predetermined level-lowering coefficient, the screen set length, the ratio, and a predetermined desired duration;
determining a greater cache threshold from the dynamic cache threshold and the predetermined second cache threshold;
determining whether the predicted bandwidth is greater than or equal to a product of a playback bitrate of the each candidate playback level and the predetermined level-lowering coefficient and whether the size of the cached data is greater than a sum of the greater cache threshold and the size of unreceived data;
determining the each candidate playback level as the candidate playback level in response to determining that the predicted bandwidth is greater than or equal to the product of the playback bitrate of the each candidate playback level and the predetermined level-lowering coefficient and the size of the cached data is greater than the sum of the greater cache threshold and the size of the unreceived data; and
determining the each candidate playback level as a non-candidate playback level in response to determining that the predicted bandwidth is less than or equal to the product of the playback bitrate of the each candidate playback level and the predetermined level-lowering coefficient or the size of the cached data is less than or equal to the sum of the greater cache threshold and the size of the unreceived data.

10. The method according to claim 9, wherein calculating the dynamic cache threshold based on the predetermined level-lowering coefficient, the screen set length, the ratio, and the predetermined desired duration comprises:
calculating a first dynamic threshold $j_1$ by the following formula: $j_1=t\times(1-\beta)/\beta$ wherein $\beta$ represents the level-lowering coefficient, and t represents the predetermined desired duration;
calculating a second dynamic threshold $j_2$ by the following formula: $j_2=(br(x0)/bw-1)\times gopLen\times\gamma$, wherein $br(x0)$ represents the current playback bitrate, bw represents the predicted bandwidth, gopLen represents the screen set length, and $\gamma$ represents the screen set non-sending ratio; and calculating a sum of the first dynamic threshold and the second dynamic threshold, and determining the sum as the dynamic cache threshold.

11. The method according to claim 1, wherein determining the playback level at least one level lower than the current playback level as the target playback level in response to determining that the network is in the second-level congested state comprises:
acquiring playback levels with playback bitrates less than the predicted bandwidth in response to determining that the network is in the second-level congested state; and
determining a highest playback level from the playback levels with the playback bitrates less than the predicted bandwidth as the target playback level.

12. The method according to claim 11, wherein determining the playback level at least one level lower than the current playback level as the target playback level in response to determining that the network is in the second-level congested state further comprises:
determining a playback level one level lower than the current playback level as the target playback level in response to determining the greatest playback level from the playback levels with the playback bitrates less than the predicted bandwidth as the current playback level.

13. A method for playing back videos, comprising:
receiving a recommended target playback level in playing back video data at a current playback level; and
switching from the current playback level to the recommended target playback level in response to a select operation on the recommended target playback level, and playing back received video data at the recommended target playback level, wherein the recommended target playback level is determined by:
acquiring data of a video sending state, a size of cached data, and a predicted bandwidth;
determining, based on the data of the video sending state and the size of the cached data, whether a network is in a first-level congested state;
determining a target playback level higher than a current playback level based on the predicted bandwidth, the size of the cached data, and a predetermined first cache threshold in response to determining that the network is not in the first-level congested state;
determining, based on the data of the video sending state and the size of the cached data, whether the network is in a second-level congested state in response to determining that the network is in the first-level congested state, wherein a congestion degree of the second-level congested state is greater than a congestion degree of the first-level congested state;
determining a target playback level from the current playback level and playback levels lower than the current playback level based on the predicted bandwidth, the size of the cached data, and a predetermined second cache threshold in response to determining that the network is in a non-second-level congested state; and
determining a playback level at least one level lower than the current playback level as a target playback level in response to determining that the network is in the second-level congested state.

14. An electronic device for determining a video playback level, comprising:
one or more processors;
a memory, configured to store one or more programs, wherein the one or more processors, when loading and running the one or more programs, are caused to:
acquire data of a video sending state, a size of cached data, and a predicted bandwidth;
determine, based on the data of the video sending state and the size of the cached data, whether a network is in a first-level congested state;
determine a target playback level higher than a current playback level based on the predicted bandwidth, the size of the cached data, and a predetermined first cache threshold in response to determining that the network is not in the first-level congested state;
determine, based on the data of the video sending state and the size of the cached data, whether the network is in a second-level congested state in response to determining that the network is in the first-level congested state, wherein a congestion degree of the second-level congested state is greater than a congestion degree of the first-level congested state;
determine a target playback level from the current playback level and playback levels lower than the current playback level based on the predicted bandwidth, the size of the cached data, and a predetermined second cache threshold in response to determining that the network is in a non-second-level congested state; and
determine a playback level at least one level lower than the current playback level as a target playback level in response to determining that the network is in the second-level congested state.

15. A non-transitory computer-readable storage medium, storing a computer program, wherein the computer program, when loaded and run by a processor, causes the processor to perform the method for determining the video playback level as defined in claim 1.

16. A non-transitory computer-readable storage medium, storing a computer program, wherein the computer program, when loaded and run by a processor, causes the processor to perform the method for playing back the videos as defined in claim 13.

17. An electronic device for playing back videos, comprising:
one or more processors;
a memory, configured to store one or more programs, wherein the one or more processors, when loading and running the one or more programs, are caused to perform the method for playing back the videos as defined in claim 13.

18. The electronic device according to claim 14, wherein the data of the video sending state comprises a size of unsent data and a size of unreceived data, and
the one or more processors, when loading and running the one or more programs, are caused to:
calculate a first sum of the size of the unsent data and the size of the unreceived data;
determine whether the size of the cached data is greater than or equal to a product of the first sum and a predetermined first accumulation coefficient and whether the first sum is less than or equal to a predetermined first accumulation threshold;
determine that the network is in the first-level congested state in response to determining that the size of the cached data is greater than or equal to the product of the first sum and the predetermined first accumulation coefficient and the first sum is less than or equal to the predetermined first accumulation threshold; and determine that the network is in a non-congested state in response to determining that the size of the cached data is less than the product of the first sum and the predetermined first accumulation coefficient or the first sum is greater than the predetermined first accumulation threshold.

19. The electronic device according to claim 14, wherein the one or more processors, when loading and running the one or more programs, are caused to:

determine whether the size of the cached data is greater than the predetermined first cache threshold;

acquire playback bitrates of at least one playback level higher than the current playback level in response to determining that the size of the cached data is greater than the predetermined first cache threshold;

determine the target playback level from the at least one playback level higher than the current playback level based on the playback bitrates; and perform the process of determining, based on the data of the video sending state and the size of the cached data, whether the network is the second-level congested state in response to determining that the size of the cached data is less than or equal to the predetermined first cache threshold.

20. The method according to claim 19, wherein the one or more processors, when loading and running the one or more programs, are caused to:

for any two adjacent first playback level and second playback level that are higher than the current playback lever, acquire a level-raising coefficient of the first playback level by calculating a ration of a playback bitrate of the second playback level to a playback bitrate of the first playback level, wherein the second playback level is higher than the first playback level;

calculate a product of the playback bitrate of the first playback level and the level-raising coefficient;

determine whether the predicted bandwidth is greater than the produce;

determine the first playback level as a candidate playback level in response to determining that the predicted bandwidth is greater than the product; and select a highest level from candidate playback levels and determining as the target playback level.

\* \* \* \* \*